June 10, 1969　　F. SCHEFFLER ETAL　　3,449,539
APPARATUS FOR INDUCTIVELY HEATING WORKPIECES
Filed May 25, 1967
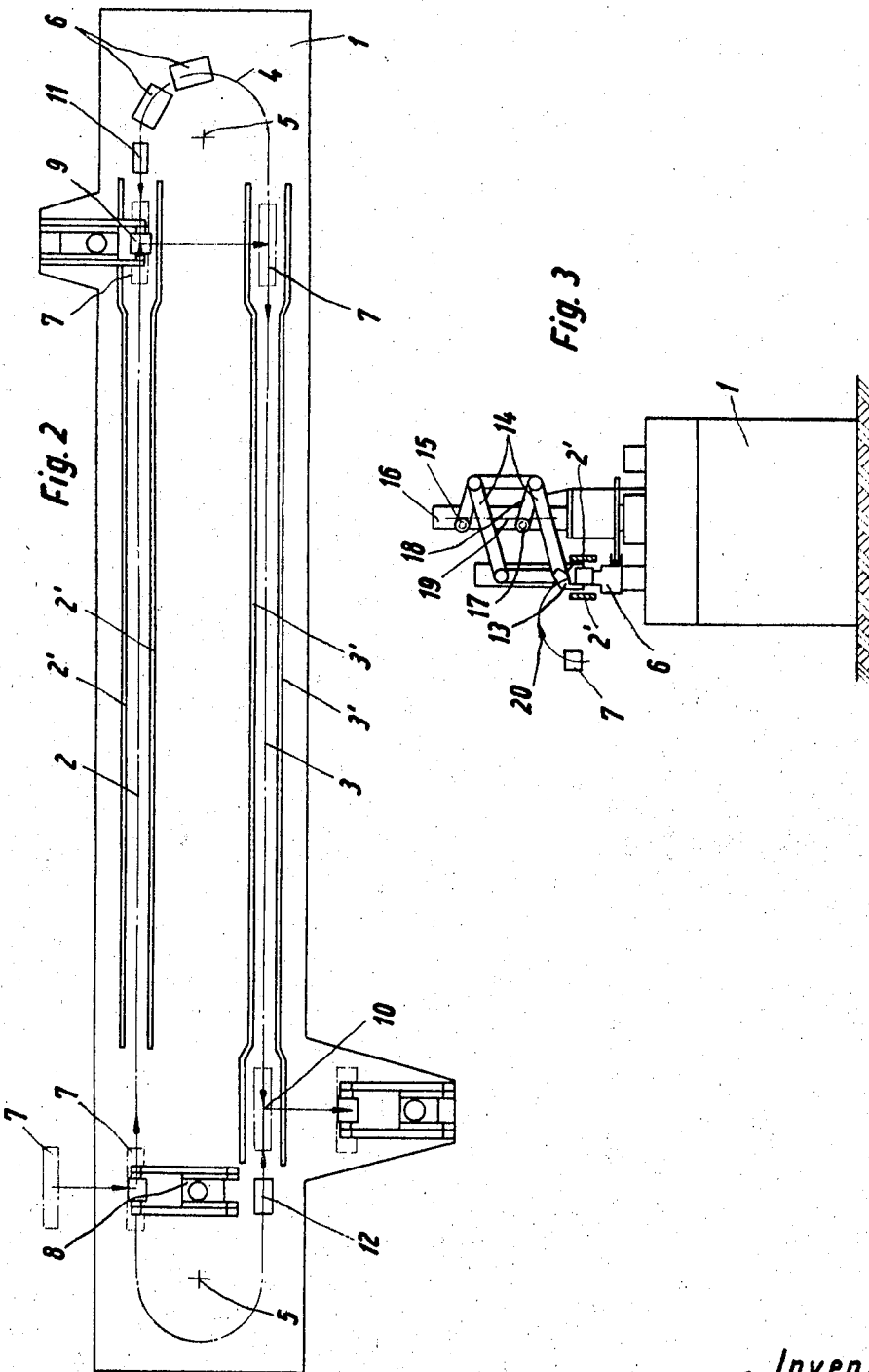

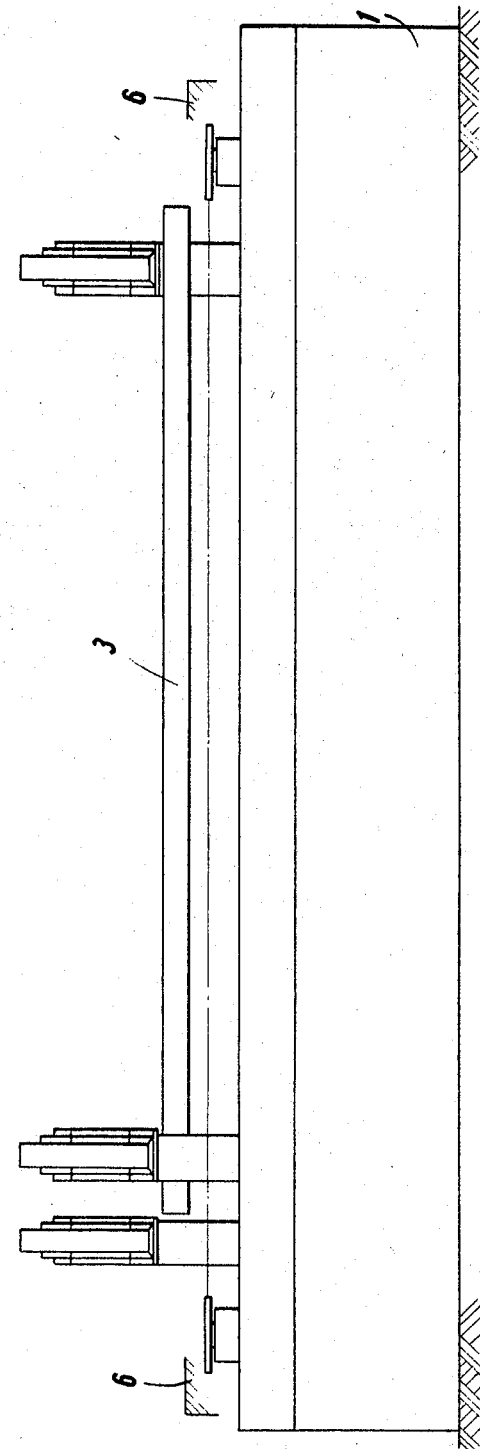

United States Patent Office 3,449,539
Patented June 10, 1969

3,449,539
APPARATUS FOR INDUCTIVELY
HEATING WORKPIECES
Friedrich Scheffler, Remscheid, Ernst Stangl, Remscheid-Reinshagen, and Friedrich Karl Gehrmann, Remscheid, Germany, assignors to AEG-Elotherm G.m.b.H., Remscheid-Hasten, Germany
Filed May 25, 1967, Ser. No. 641,364
Claims priority, application Germany, June 18, 1966,
A 52,778
Int. Cl. H05b 9/06
U.S. Cl. 219—10.69                    4 Claims

ABSTRACT OF THE DISCLOSURE

Plants for inductively heating metal workpieces in cross-field inductors using long plate inductors are often too large for existing shop floors, and the arrangement according to the invention provides two cross-field inductors with workpiece-transferring means between the end of one and the beginning of the other. With the arrangement according to the invention, one cross-field inductor may be "doubled-up" on the other, thus further conserving floor space.

---

This invention relates to apparatus for inductively heating metal workpieces which may particularly be in the form of small ingots for hot-shaping.

Inductive heating of such workpieces should not be confined to the workpiece surfaces, but should penetrate into the interior of the workpiece. Such deep heating cannot be achieved simply by increasing the electrical power supplied to the inductor, but sufficient time must elapse to allow heat generated substantially in the external layers to penetrate into the interior of the workpiece. Also heat losses by radiation must be avoided so that the required temperature level may be reached without difficulty preventing a non-uniform temperature distribution in the workpiece. These requirements necessitate the provision of large induction heating equipment in order to attain the necessary exposure times, which is a disadvantage when the required floor space is not available in forging and hot-shaping workshops.

It is an object of the invention to provide apparatus for the inductive heating of workpieces, which may occupy a relatively smaller area of floor space than comparable equipment heretofore used, using cross-field inductors of the type which comprise two conductor bars, which cross-field inductors are preferably arranged parallel to each other and along which the workpieces successively move for being inductively heated therein. For conveying the workpieces it is proposed to use an articulated conveyor chain which runs over chain wheels mounted either on horizontal or vertical axles in known manner.

The invention consists of apparatus for inductively heating workpieces, comprising two cross-field inductors disposed adjacent to each other, an endless chain conveyor arranged and adapted to convey workpieces successively through both cross-field inductors, and workpiece-transferring means for lifting the workpiece from the conveyor at the end of the heating path of the first cross-field inductor and redepositing the said workpiece at the beginning of the heating path of the second cross-field inductor.

In the arrangement according to the invention the workpieces may travel through the adjacent cross-field inductors in opposite directions, so that the workpieces may initially be deposited on the conveyor chain and finally removed therefrom by suitable means placed at the same end of the induction heating equipment. The initial deposition on and final removal from, the conveyor chain may likewise be carried out by workpiece-transferring means. This form of construction provides an apparatus which in relation to the total length of the necessary heating path, is relatively short, and which is therefore capable of erection in the immediate neighbourhood of a hot shaping machine.

It is preferred that the endless conveyor chain runs over chain wheels rotatable on vertical axles.

In order to prevent the workpieces from cooling during their transference from the first to the second inductor, and also at the discharge end of the inductor, the parallel conductor bars of the inductor preferably extend to these points where the workpieces are manipulated. To provide space for the manipulator, the distance between the conductor bars at these points may be increased.

An embodiment of the invention is hereinafter described and illustrated in the accompanying drawings, of which
  FIGURE 1 is a side elevation of the apparatus,
  FIGURE 2 is a plan view of the said apparatus, and
  FIGURE 3 an end-on view of apparatus according to the invention.

Referring to the drawings, on a base 1 two cross-field inductors 2 and 3 are mounted in parallel. These inductors comprise conductor bars 2' and 3' which are likewise parallel. An articulated conveyor chain 4 is provided underneath these inductors, the chain travelling over chain wheels 5 revolving on vertical axles. The conveyor chain is fitted with carriers 6 upon which the workpieces 7 can be deposited and conveyed through the heating space between the conductor bars 2' and 3'.

When the workpieces in the form of brick-shaped ingots are thus heated they must not be allowed to come into mutual contact to prevent them from fusing together. Moreover, at the return points of the chain the workpieces could be dislodged from their carriers 6 or they might move into awkward uncontrolled positions before entering the second inductor in the opposite direction of travel. The workpiece must travel through the inductor 2 as well as through the inductor 3 in such a way that there is no risk of contact between them and the conductor bars.

For this reason manipulators are provided both at the entry end 8 and at the return end 9. These manipulators deposit the workpieces 7 on the carriers 6 of the chain 4 so that they can be conveyed through the first inductor 2. At the transfer point 9 a manipulator lifts the workpieces 7 off the chain and redeposits them on the chain or rather on the carriers 6 at the entry end of the second inductor 3. A manipulator is also provided at the discharge end 10 for lifting the workpieces off the chain 4, i.e. off the carriers 6, and for transferring them to a conveyor, a receiving device or the like. The movement of the manipulators at 9 and 10 is initiated by contacts 11 and 12 operated by the workpieces. The manipulator at the entry end at 8 works in a similar fashion.

The manipulators may be of any conventional form of construction. In the illustrated example they have the form of an oil-hydraulically operable gripper 13 on the end of a parallelogram linkage 14. The linkage is pivotably mounted at 15 on a column 16. A gear wheel 17 attached to a lever 18 and meshing with a rack 19 operates the linkage in such a way that the workpieces, after having been gripped by the gripper 13, are first lifted off and then conveyed along the path indicated by an arrow 20. The gripper arms of the proposed manipulator are operated accordingly. The manipulator permits the workpieces to be deposited on the articulated chain in accurate alignment and to be removed from the chain. The workpieces can be thus deposited, lifted and transferred whilst the chain remains in continuous motion.

It is advisable to extend the conductor bars 2' and 3' of the inductors to embrace the transfer stations in order to provide the necessary heat at these points. However, the spacing of the parallel conductor bars 2' and 3' at these points is increased to provide space for the gripper of the manipulator to descend between the bars without being obstructed.

The carriers on the articulated chain preferably consist of a refractory ceramic material.

What is claimed is:

1. Apparatus for inductively heating workpieces, comprising two cross-field inductors disposed adjacent to each other, an endless chain conveyor arranged and adapted to convey workpieces successively through both cross-field inductors, and workpiece-transferring means for lifting the workpiece from the conveyor at the end of the heating path of the first cross-field inductor and redepositing the said workpiece at the beginning of the heating path of the second cross-field inductor.

2. Apparatus as claimed in claim 1, in which the said two cross-field inductors are disposed so that their heating paths are parallel to each other, and means for initially placing workpieces on the conveyor chain and means for finally removing heated workpieces from the conveyor chain, are placed at the same end of the apparatus.

3. Apparatus as claimed in claim 1, in which the said endless conveyor chain runs over chain wheels rotatable on vertical axles.

4. Apparatus as claimed in claim 1, in which the parallel conductor bars of each of the said inductors are more widely spaced from each other in the region of the said workpiece-transferring means.

References Cited

UNITED STATES PATENTS 3,127,496   3/1964   Finzi et al. _____ 219—10.69 X

FOREIGN PATENTS 1,041,662   10/1953   France.

OTHER REFERENCES

Cable: "Induction and Dielectric Heating," 1954, Reinhold Publishing Corp., New York, p. 277.

ANTHONY BARTIS, Primary Examiner.

L. H. BENDER, Assistant Examiner.

U.S. Cl. X.R.

219—10.71